Patented Jan. 16, 1945

2,367,534

UNITED STATES PATENT OFFICE 2,367,534

PARASITICIDES

Frank B. Smith and John N. Hansen, Midland, Mich., assignors to The Dow Chemical Company, Midland, Mich., a corporation of Michigan No Drawing. Application February 15, 1941,
Serial No. 379,015

18 Claims. (Cl. 167—31)

This invention relates to parasiticides and particularly to insecticidal and fungicidal compositions in which the diaryl-guanidine and aryl-biguanide salts of dinitrophenols are employed as active toxicants.

Many synthetic organic compounds have been suggested as substitutes for lead, arsenic and copper-containing inorganic compounds as currently employed in insecticidal and fungicidal compositions. Many of these synthetic toxicants are injurious to plants, toxic to humans, and incompatible with other insecticidal materials.

Phenols as a class have not been found entirely satisfactory, due to their solubility in water and high volatility, whereby they are readily leached or vaporized away from plant surfaces. Furthermore, they are frequently corrosive to the skin of humans and produce aqueous solutions which burn foliage or adversely affect normal plant metabolism. Phenols containing one or more nitro groups substituted in the benzene nucleus are highly effective, when properly compounded, against selected fungi and insects. Many of these compounds and their salts, however, are freely soluble in water and relatively impermanent in their action, due to their high volatility and tendency to oxidize or otherwise disintegrate upon contact with the air.

We have discovered that the addition salts obtained by the reaction of the dinitro-phenols with diaryl-guanidines or aryl-biguanides are effective fungicidal and insecticidal toxicants, and that compositions comprising the less water-soluble of these products may be applied to growing foliage at lethal concentrations without causing plant injury to the extent previously inherent in the use of free phenols and their more soluble metallic salts.

The diaryl-guanidine and aryl-biguanide salts of the dinitro-phenols are, for the most part, crystalline solids of low volatility, stable to light and air, and not appreciably affected by carbon dioxide. These compounds may be prepared by reacting a diaryl-guanidine or an aryl-biguanide with a dinitro-phenol to form the addition salt. The reaction may be carried out by contacting benzene solutions of equimolecular proportions of a dinitro-phenol and amine, although any suitable amounts of the reactants may be employed. Reduced amounts of the solvent are required if the reaction is carried out at temperatures between 40° and 120° C., as, for example, at the refluxing temperature of the reaction mixture when benzene or benzene and ethyl alcohol are employed. On addition of the amine solution to a solution of the dinitro-phenol, the insoluble addition salt of the dinitro-phenol generally begins to separate or precipitate out of the mixture. The reaction is complete within from 30 minutes to 1 hour after the reactants are combined. The reaction mixture can then be cooled and filtered to separate out the desired phenolate product, which may be further purified by washing with a small amount of such solvents as benzene, chlorobenzene, and the like. When the addition salt does not precipitate from the solution, the desired product may be separated by evaporating off the reaction solvent. In either case, the phenolate derivative is air-dried to remove residual solvent prior to use.

While this invention is concerned with parasiticide compositions comprising the diaryl-guanidine or aryl-biguanide salts of dinitro-phenols generally, it is particularly directed to compositions embodying the reaction product obtained by the addition of the foregoing amines to 2.4-dinitro-phenols. 2.4-dinitro-phenol compounds which have been found especially valuable as insecticidal and fungicidal toxicants are those derived from the reaction of the diaryl-guanidines and aryl-biguanides with phenols having the formula

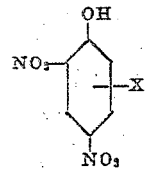

wherein X represents a radical selected from the group consisting of aryl, alkyl, cycloalkyl, and aralkyl. These compounds are difficultly soluble, high-melting crystalline solids which are yellow to orange-red in color. They have an extremely low solubility in water, generally below 0.25 gram per 100 milliliters at 25° C. This low solubility of the salt compounds, coupled with their high-melting point, stability, and low vapor pressure, results in an extended residual toxicity against insect pests and reduced foliage injury for compositions in which they are employed as toxic ingredients. This is of particular importance in spray compositions comprising the compounds but is of general concern in the maintenance of toxic residues on tree surfaces which may be contacted by rain or dew. A further advantage in the use of these salts lies in the fact that their properties of solubility and stability permit their use in combination with common organic and inorganic insecticidal toxicants which heretofore have been considered incompatible with phenols and phenolates.

The physical characteristics of representative diaryl-guanidine and aryl-biguanide salts of dinitro-phenols are set forth in the following table:

TABLE

| Compound | Melting point | Solubility in grams per 100 grams of water at 25° C. | pH of saturated solution | Color |
| --- | --- | --- | --- | --- |
| | °C. | | | |
| Phenyl-biguanide salt of 2,4-dinitro-phenol | 162–3 | 0.470 | 7.3 | Yellow. |
| Phenyl-biguanide salt of 2,4-dinitro-6-cyclohexyl-phenol | 183 | 0.013 | 6.6 | Orange. |
| Diphenyl-guanidine salt of 2,4-dinitro-6-methyl-phenol | 150–1 | 0.156 | 6.8 | Yellow. |
| Diphenyl-guanidine salt of 2,4-dinitro-6-cyclohexyl-phenol | 172–3 | 0.0066 | 6.3 | Orange-red. |

Other diaryl-guanidine and aryl-biguanide salts of dinitro-phenols which may be employed as parasiticide toxicants as herein disclosed include the addition compounds obtained by reacting such amines as alpha-naphthyl-biguanide, xylyl-biguanide, tolyl-biguanide, chlorophenyl-biguanide, dixylyl-guanidine, ditolyl-guanidine, di-(chlorophenyl)-guanidine, and dixenyl-guanidine with 2,6-dinitro-phenol, 2,5-dinitro-phenol, 2,6-dinitro-4-methyl-phenol, 2,4-dinitro-6-n-hexyl-phenol, 2,4-dinitro-6-phenyl-phenol, 2,4-dinitro-6-benzyl-phenol, 2,4-dinitro-6-chloro-phenol, 2,4-dinitro-5-naphthylamino-phenol, 2,5-dinitro-6-cyclohexyl-phenol, 2,4-dinitro-5-cyclohexyl-phenol, 2,6-dinitro-4-cyclohexyl-phenol, and the like.

The compounds set forth above may be employed generally as toxicants in parasiticide preparations. They may be used as constituents of either dusting or spraying compositions. In such use, they may be compounded with various inert carriers, such as diatomaceous earth, bentonite, talc, sulfur, wood flours, inorganic phosphates, and the like, to form dusts adapted to be applied with standard dusting equipment. If desired, such dusts may be employed as concentrates and subsequently diluted with additional inert carrier or suspended in water or other liquid carrier to form sprays. The diaryl-guanidine and aryl-biguanide addition salts may also be mixed with various wetting, dispersing, and sticking agents to form concentrates adapted to be diluted to produce spray compositions in which the phenolate is present in any desired concentration.

In the preparation of concentrates, from about 5 to about 90 per cent by weight of the amine addition salt is commonly employed. The concentration of the amine salt in spray or dust compositions on application to plants is preferably between about 0.01 and 5.0 per cent by weight. The composition type in which the amine salt is employed and the concentration thereof in the final composition are dependent upon the particular parasite, e. g. insect or fungus, to be controlled, and the circumstances under which such control is to be accomplished.

In other embodiments of the invention the amine addition salts may be employed in combination with oil emulsions. They may also be used in water suspension with or without an additional emulsifying, wetting, or dispersing agent. Where it is desired to impregnate solid carriers with the addition salt, the carrier may be introduced into the salt reaction mixture and the phenolate precipitated directly in and on the carrier surfaces. An alternate procedure consists of first wetting the carrier with one of the reactants dissolved in a suitable organic solvent and thereafter contacting the mixture with a solution of the second reactant to produce the desired compound in situ.

The diaryl-guanidine and aryl-biguanide addition salts may similarly be incorporated in other standard type insecticidal compositions either as the sole toxic ingredient of such composition or in combination with such materials as inorganic pigments, organic dyes, lead arsenate, pyrethrine, rotenone, cryolite, zinc sulfide, organic thiocyanates, sulfur, copper sprays, aryloxy-alkylols, aryloxy-alkyl-halides, aryloxy-alkoxy-alkyl-halides, etc.

The several examples are illustrative with respect to the particular compound, composition type, and concentration employed but are not to be construed as limiting the invention:

EXAMPLE 1

20 parts by weight of the diphenyl-guanidine salt of 2,4-dinitro-6-cyclohexyl-phenol and 80 parts by weight of diatomaceous earth were ground together in a ball mill to an average particle size of less than 5 microns diameter. .15 pounds of the ground composition was dispersed in 100 gallons of water to give a spray mixture comprising 3.0 pounds of the active toxicant. This spray was applied to potato foliage infested with Colorado potato beetle larvae and killed 94 per cent of the organisms in 2 days. In a comparative determination, acid lead arsenate at a concentration of 3 pounds in 100 gallons killed 69 per cent of the potato beetle larvae in 2 days.

EXAMPLE 2

90 parts by weight of the diphenyl-guanidine salt of 2,4-dinitro-6-cyclohexyl-phenol and 10 parts by weight of sodium lauryl sulfate were ground together in a ball mill to form a parasiticide concentrate. A dispersion of 1.1 pounds of this mixture in 100 gallons of water killed 100 per cent of ten caterpillars in 2 days. A similar control was obtained with a dispersion of 3 pounds of acid lead arsenate in 100 gallons of water. The composition containing the amine addition salt was found to be substantially less injurious to apple foliage than was the composition containing the acid lead arsenate.

Against Colorado potato beetle larvae this concentrate at 0.55 pound per 100 gallons gave a control of 97.5 per cent in 2 days. In this determination the control composition of 3 pounds of acid lead arsenate per 100 gallons gave a mortality of 59.6 per cent of the organisms in 2 days.

An aqueous composition containing 0.55 pound of the concentrate per 100 gallons gave a control against adult Mexican bean beetle of 70 per cent in 5 days, compared to a control of 25 per cent for acid lead arsenate at 3 pounds per 100 gallons.

0.33 pound of the concentrate in 100 gallons of water was found to give a 100 per cent kill of cabbage worm larvae in 2 days, as compared to an 80 per cent control when 3 pounds of acid lead arsenate per 100 gallons of spray material was employed.

A dispersion of 0.55 pound of the concentrate in 100 gallons of water gave a control against adult red spider of 100 per cent and against young red spider of 99.3 per cent in 2 days. When this composition was applied to red spider eggs, the eggs hatched but the young spiders were either dead at emergence or died immediately thereafter.

EXAMPLE 3

45 parts by weight of the diphenyl-guanidine salt of 2.4-dinitro-6-cyclohexyl-phenol, 45 parts of diatomaceous earth, and 10 parts of sodium lauryl sulfate were ground together to form an insecticidal concentrate. 1.1 pounds of this mixture was dispersed in 100 gallons of water to obtain a composition comprising 0.5 pound of the toxicant. This dilute spray material killed 100 per cent of tent caterpillar larvae in 2–3 days without injury to apple foliage. A similar control of the larvae was obtained with 3 pounds of acid lead arsenate in 100 gallons of water.

EXAMPLE 4

A saturated water solution of the diphenyl-guanidine salt of 2.4-dinitro-6-cyclohexyl-phenol was modified by the addition of sodium lauryl sulfate in the amount of 0.5 pound per 100 gallons of solution. The resulting spray composition gave a 100 per cent control against adult red spiders in 3 days.

EXAMPLE 5

20 parts by weight of the diphenyl-guanidine salt of 2.4-dinitro-6-methyl-phenol and 80 parts by weight of diatomaceous earth were ground together to an average particle size of 5 microns diameter. 2.5 pounds of this mixture was dispersed in 100 gallons of water to provide for the presence of the toxicant in the amount of 0.5 pound. The resulting spray composition gave a control against Colorado potato beetle larvae of 61.2 per cent in 2 days.

EXAMPLE 6

In a similar manner 20 parts by weight of the phenyl-biguanide salt of 2.4-dinitro-phenol was ground with 80 parts by weight of diatomaceous earth. A dispersion of 2.5 pounds of this mixture in 100 gallons of water gave a kill against Colorado potato beetle larvae of 48.8 per cent in 2 days.

EXAMPLE 7

20 parts by weight of the phenyl-biguanide salt of 2.4-dinitro-6-cyclohexyl-phenol was ground with 80 parts of diatomaceous earth substantially as described above. The resulting composition at 15 pounds per 100 gallons gave a 99 per cent control of Colorado potato beetle larvae in 2 days. A composition comprising 3 pounds of acid lead arsenate per 100 gallons gave a control of 69 per cent of the potato beetle larvae in 2 days.

EXAMPLE 8

90 parts by weight of the phenyl-biguanide salt of 2.4-dinitro-6-cyclohexyl-phenol and 10 parts of sodium lauryl sulfate were ground together to an average particle size of less than 5 microns. At 1.1 pounds per 100 gallons this composition gave a control against tent caterpillar larvae of 100 per cent in 2 days. Acid lead arsenate at 3 pounds per 100 gallons killed 80 per cent in 2 days and 100 per cent in 3 days.

A dilute aqueous composition comprising 0.55 pound of the amine salt concentrate gave a kill against Colorado potato beetle larvae of 100 per cent in 3 days. Against Mexican bean beetle larvae this composition killed 70 per cent in 3 days with but 20 per cent feeding, compared to a kill for acid lead arsenate at 3 pounds to 100 gallons of 25 per cent in 3 days with 70 per cent feeding. Against poplar aphis the amine salt dispersion killed 98 per cent in 3 days; and against *Aphis rumicis*, 96.2 per cent in 2 days.

EXAMPLE 9

45 parts by weight of phenyl-biguanide salt of 2.4-dinitro-6-cyclohexyl-phenol, 45 parts of diatomaceous earth, and 10 parts of sodium lauryl sulfate were ground together to an average particle size of less than 5 microns. When 2.2 pounds of this concentrate was dispersed in 100 gallons of water, a composition was obtained giving a kill of 100 per cent against tent caterpillar larvae in 2 days. A more dilute composition comprising 1.1 pounds of the mixture per 100 gallons gave a control against adult red spider of 93 per cent and against young red spiders of 100 per cent in 2 days. Red spider eggs treated with this composition hatched but the young spiders were either dead on emergence or died soon thereafter.

EXAMPLE 10

0.5 pound of sodium lauryl sulfate was added to 100 gallons of a saturated water solution of the phenyl-biguanide salt of 2.4-dinitro-6-cyclohexyl-phenol. The resulting composition gave a 100 per cent kill against adult red spiders in 3 days.

EXAMPLE 11

Compositions comprising the diaryl-guanidine and aryl-biguanide salts of the dinitro-phenols as toxic ingredients and adapted to be employed in dusting operations are illustrated by the following compositions.

*Composition 1*

| | Parts by weight |
|---|---|
| Dixylyl-guanidine salt of 2.4-dinitro-phenol | 1 |
| Sulfur | 99 |

*Composition 2*

| | Parts by weight |
|---|---|
| Diphenyl-guanidine salt of 2.4 - dinitro - 6-methyl-phenol | 2 |
| Walnut shell flour | 98 |

*Composition 3*

| | Parts by weight |
|---|---|
| Tolyl-biguanide salt of 2.4-dinitro-6-n-hexyl-phenol | 2.5 |
| Diatomaceous earth | 97.5 |

*Composition 4*

| | Parts by weight |
|---|---|
| Phenyl-biguanide salt of 2.4-dinitro-6-cyclohexyl-phenol | 2.0 |
| Petroleum oil | 1.5 |
| Bentonite | 96.5 |

The above and related compositions may be applied with standard dusting equipment for the control of codling moth, red spider, thrips, and other parasites. Also, they may be dispersed in water in amounts of from 0.25 pound to 50 pounds per 100 gallons to form aqueous suspensions suitable for application to the trunks and branches of trees during the dormant period or for spraying the ground adjacent to trees or shrubs. When applied in this manner the amine salts serve as active toxicants not only for the control of insect pests but also for the control of various spore-forming fungi. In such dilute form the compositions may be used with any suitable emulsifying or dispersing agent, such as sodium lauryl sulfate, partially-neutralized sulfonated sperm oil, pine oil, sodium salt of sulfonated castor oil, methyl cellulose, blood albumen, gum arabic, casein, and the like.

The diaryl-guanidine and aryl-biguanide salts of dinitro-phenols as described herein are relatively non-toxic to humans in the concentrations employed, as compared with insecticide and fungicide compositions containing lead, arsenic, mercury, cyanide, fluorine, copper, etc. Numerous instances in which the amine salts have been contacted with the skin of humans indicate that they are relatively non-corrosive and not inclined to produce dermatitis, even on repeated application.

A copending application Serial No. 378,972, filed concurrently herewith now United States Patent No. 2,304,821 sets forth the preparation and physical characteristics of a number of diaryl-guanidine and aryl-biguanide salts of dinitro-phenols and claims these addition salts as new compounds.

Other modes of applying the principle of our invention may be employed instead of those explained, change being made as regards the materials and amounts concerned, provided the ingredients stated by any of the following claims or their equivalent be employed.

We therefore particularly point out and distinctly claim as our invention:

1. An insecticidal and fungicidal composition comprising as a toxic ingredient a compound selected from the class consisting of the diaryl-guanidine and aryl-biguanide salts of dinitro-phenols in intimate mixture with a carrier.

2. An insecticidal composition comprising as a toxic ingredient a compound selected from the group consisting of the diaryl-guanidine and aryl-biguanide salts of dinitro-phenols in intimate mixture with a finely-divided solid carrier.

3. An insecticidal and fungicidal spray comprising an aqueous dispersion of a finely-divided compound selected from the class consisting of the diaryl-guanidine and aryl-biguanide salts of dinitro-phenols.

4. An insecticidal and fungicidal composition comprising as a toxic ingredient a diaryl-guanidine salt of a 2.4-dinitrol-phenol in intimate mixture with a carrier.

5. An insecticidal and fungicidal composition comprising as a toxic ingredient a diaryl-guanidine salt of a phenol having the formula

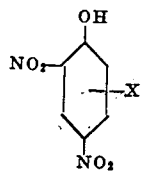

wherein X represents a radical selected from the group consisting of aryl, alkyl, cycloalkyl, and aralkyl in intimate mixture with a carrier.

6. An insecticidal and fungicidal composition comprising as a toxic ingredient a diphenyl-guanidine salt of a 2.4-dinitro-phenol in intimate mixture with a carrier.

7. An insecticidal and fungicidal composition comprising as a toxic ingredient the diphenyl-guanidine salt of a phenol having the formula

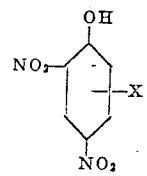

wherein X represents a radical selected from the group consisting of aryl, alkyl, cycloalkyl, and aralkyl in intimate mixture with a carrier.

8. An insecticidal and fungicidal composition comprising as a toxic ingredient the diphenyl-guanidine salt of 2.4-dinitro-6-methyl-phenol in intimate mixture with a carrier.

9. An insecticidal and fungicidal composition comprising as a toxic ingredient the diphenyl-guanidine salt of 2.4-dinitro-6-cyclohexyl-phenol in intimate mixture with a carrier.

10. An insecticidal and fungicidal composition comprising as a toxic ingredient an aryl-biguanide salt of a 2.4-dinitro-phenol in intimate mixture with a carrier.

11. An insecticidal and fungicidal composition comprising as a toxic ingredient an aryl-biguanide salt of a phenol having the formula

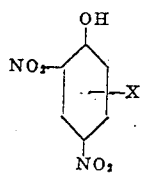

wherein X represents a radical selected from the group consisting of aryl, alkyl, cycloalkyl, and aralkyl in intimate mixture with a carrier.

12. An insecticidal and fungicidal composition comprising as a toxic ingredient a phenyl-biguanide salt of a 2.4-dinitro-phenol in intimate mixture with a carrier.

13. An insecticidal and fungicidal composition comprising as a toxic ingredient a phenyl-biguanide salt of a phenol having the formula

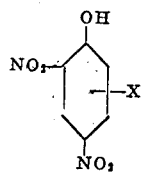

wherein X represents a radical selected from the group consisting of aryl, alkyl, cycloalkyl, and aralkyl in intimate mixture with a carrier.

14. An insecticidal and fungicidal composition comprising as a toxic ingredient the phenyl-biguanide salt of 2.4-dinitro-6-cyclohexyl-phenol in intimate mixture with a carrier.

15. An insecticidal composition comprising as a toxic ingredient a diphenyl-guanidine salt of a phenol having the formula

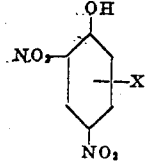

wherein X represents a radical selected from the group consisting of aryl, alkyl, cycloalkyl, and aralkyl, in intimate mixture with a finely-divided solid carrier.

16. An insecticidal composition comprising as a toxic ingredient a diaryl-guanidine salt of 2.4-dinitro-6-cyclo-hexyl-phenol in intimate mixture with a finely-divided solid carrier.

17. An insecticidal composition comprising as a toxic ingredient a phenyl-biguanide salt of a phenol having the formula

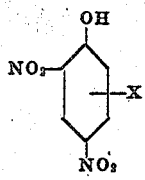

wherein X represents a radical selected from the group consisting of aryl, alkyl, cycloalkyl, and aralkyl, in intimate mixture with a finely-divided carrier.

18. An insecticidal composition comprising as a toxic ingredient an aryl-biguanide salt of 2.4-dinitro-6-cyclohexyl-phenol in intimate mixture with a finely-divided solid carrier.

FRANK B. SMITH.
JOHN N. HANSEN.